United States Patent
Steijer et al.

(10) Patent No.: US 6,402,389 B1
(45) Date of Patent: Jun. 11, 2002

(54) ANGLED OPTO-MECHANICAL DEVICE

(75) Inventors: Odd Steijer, Bromma; Christer Moll, Enskede; Bengt Lindström, Älta; Christian Vieider, Sollentuna; Paul Eriksen, Tyresö; Jan-Åke Engstrand, Trångsund; Olle Larsson, Stockholm; Håkan Elderstig, Bromma, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 626 days.

(21) Appl. No.: 08/848,238

(22) Filed: Apr. 29, 1997

(30) Foreign Application Priority Data

May 3, 1996 (SE) ................................. 9601704

(51) Int. Cl.$^7$ ................................. G02B 6/38
(52) U.S. Cl. ................. 385/65; 385/114; 385/83
(58) Field of Search .................. 385/65, 83, 53–71, 385/32, 49, 52, 114

(56) References Cited

U.S. PATENT DOCUMENTS

| 4,496,215 | A | * | 1/1985 | Shaheen et al. | ............ 385/114 |
| 5,441,397 | A | * | 8/1995 | Eriksen et al. | ............ 425/116 |
| 5,452,393 | A | * | 9/1995 | Stowe et al. | ............ 385/123 |
| 5,598,494 | A | * | 1/1997 | Behrmann et al. | ............ 385/59 |
| 5,631,985 | A | * | 5/1997 | Yamada et al. | ............ 385/59 |
| 5,707,565 | A | * | 1/1998 | Suzuki et al. | ............ 264/1.25 |

FOREIGN PATENT DOCUMENTS

| EP | 0642043 A1 | * | 3/1995 | |
| GB | 2256286 A | * | 12/1992 | |
| JP | 56-30112 | * | 3/1981 | ............ 385/65 |
| JP | 62-276513 | * | 1/1987 | |
| JP | 4-36708 | * | 2/1992 | ............ 385/83 |

OTHER PUBLICATIONS

Patent Abstracts of Japan, abstract of JP,A, 62–276513 (Sumitomo Electric Ind Ltd), Dec. 1, 1987.*

* cited by examiner

Primary Examiner—Ellen E. Kim
(74) Attorney, Agent, or Firm—Burns, Doane, Swecker & Mathis, L.L.P.

(57) ABSTRACT

The present invention relates to an angled opto-mechanical connector (10) and to a manufacturing process for the same. The connector (10) comprises a fixture (1) with straight and parallel grooves (2, 3) of two sizes running on the upper side of the fixture (1) from a first fixture side (1a) to a second fixture side (1b). A lid (4) is fastened above the fixture (1). Fibre ends (8a) of optical fibres (8) are placed in the capillaries which are formed between the smaller grooves (2) of the fixture and the lid (4) in such a way that they stick out through the side of the fixture (1b). A plastic capsule (11) encloses the fixture (1), the lid (4) and the fibres (8) completely or partially. The fibres (8) stick out from the plastic capsule (11) in a direction separated from that defined by the grooves of the fixture. The connector (10) can also have an opto-mechanical interface of the above mentioned type at its other end (10b).

31 Claims, 4 Drawing Sheets

ANGLED OPTO-MECHANICAL DEVICE

TECHNICAL FIELD

The present invention relates to an angled opto-mechanical connector and to a production method for the same.

STATE OF THE ART

In order to reduce the total cost for connecting optical fibres, multifibre contacts are used. The advantage of these are that the time-demanding and thereby expensive mounting and subsequent working stages can be performed on several fibres at the same time. Several embodiments of multifibre connectors are known.

One of these is the Japanese so-called MT-connector. It is based on a precision part made of extruded thermoplastic in which the fibres are mounted (glued).

In another embodiment of multifibre connectors, an MT-compatible optical connector is directly extruded onto the fibres, see Swedish Patent Application 9301858-8. The fibres and guide pins are placed and fixed in V-grooves in the mould cavity itself after which the extrusion takes place. The method means that the gluing step disappears which rationalizes the production and is expected to lower its costs. It does, however, place a requirement for high precision in the mould cavity.

A further method is to use small precision parts, so-called fixtures, as micromechanical supporting elements. The precision parts can be produced in e.g. silicon, whereby a number of these can be obtained from a disc of silicon which can give a low manufacturing cost. The precision parts position the fibres and the guide pins in relation to each other and are cast into the connector. This permits the precision requirement of the mould cavity to be reduced considerably.

As optical short-haul links become more competitive in relation to electrical short-haul links, they will be used in existing equipment practice. In order that electrical and optical components can coexist in traditional board-wiring side equipment practice and thereby improve the chances for cost-effective total solutions, several new optical components are required. One of these is the so-called right-angle connector. An object of such a right-angle connector can be to provide a space-saving optical connection between the circuit board and the board-wiring side.

In GB 2 256 286 a bending module for optical fibres is described which comprises a two-part casing which defines a channel for the fibre. The bending module can be mounted onto a plate. The bending module is, however, not intended for fibre ribbons but only for single fibres.

DISCLOSURE OF THE INVENTION

The object of the present invention is to achieve an angled optical connector for fibre ribbons which can be quickly and easily connected, for example between circuit boards and the board-wiring side, and which gives a very low damping. The connector should have high mechanical precision and furthermore be simple and cheap to manufacture.

This is achieved by using a precision part as a micromechanical supporting element. The precision part is manufactured with grooves for fibres and guide pins. A lid is attached onto the precison part and the fibres and guide pins are positioned in respective grooves. An angled capsule is subsequently produced in a mould cavity intended for that purpose.

The precision part or fixture has straight and parallel grooves running on the upper side of the fixture from a first fixture side to a second fixture side, which grooves are intended partly for optical fibres from e.g. a fibre ribbon cable and partly for guide pins. A lid is fastened above the fixture, for example through anodic bonding. Peeled fibre ends from a fibre ribbon are placed in the grooves intended for the fibres so that the fibre ends stick out through the second fixture side. Guide pins are introduced into the grooves intended for the guide pins. They can stick out through both the first and the second fixture sides.

This structure (fixture, lid, fibre ends and guide pins) is completely or partially surrounded by a capsule, made, in particular, of plastic. The fibre ribbon sticks out from the capsule on the rear side. The fixture is so positioned that the fibre ribbon is bent through a predetermined angle in the plastic capsule.

In an alternative embodiment a second precision part with lid and guide pins is mounted at the other end of the fibre ribbon which consequently in this case is also peeled. The structure obtained (fibre ribbon with fixture, lid and guide pins mounted at each end of the fibre ribbon) is completely or partially surrounded by a capsule, made, in particular, of plastic. The two fixtures are so positioned that the fibre ribbon is bent through a predetermined angle in the plastic capsule.

Preferably, the fibres are bent through an angle of 90 degrees in the capsule but also other angles are possible, e.g. 180 degrees. The fibre ends can be polished.

The second side of the fixture can be covered by plastic which makes any necessary polishing easier. By using suitable shaped opposing means (e.g. with bevellings) in the mould cavity which give an impression with markings, the distance to the second side of the fixture can be more easily matched during polishing.

One advantage of the present invention is that the connector can be quickly and easily connected and has high mechanical precision. It is furthermore simple and cheap to manufacture.

Another advantage of the present invention is that the precision requirements on the mould cavity are considerably reduced when micromechanical supporting elements are used. The manufacturing in this way becomes more rational.

Yet another advantage of the invention is that the cast-in fixture functions as an anchor in the plastic and simplifies the fixing of the fibres.

A further advantage is that if the connector is moulded onto the fibres and fixtures (i.e. if the fibres do not need to be glued), then the manufacturing is simplified and made cheaper.

Moreover, any necessary polishing becomes easier if the second side of the fixture is covered by plastic and consequently only a combination of fibres and plastic need to be polished. By using opposing means which give an impression with markings, the distance to the second side of the fixture can be matched during polishing.

DESCRIPTION OF THE FIGURES

The invention is described more closely below with reference to the appended drawings.

PREFERRED EMBODIMENTS

Figure 1:
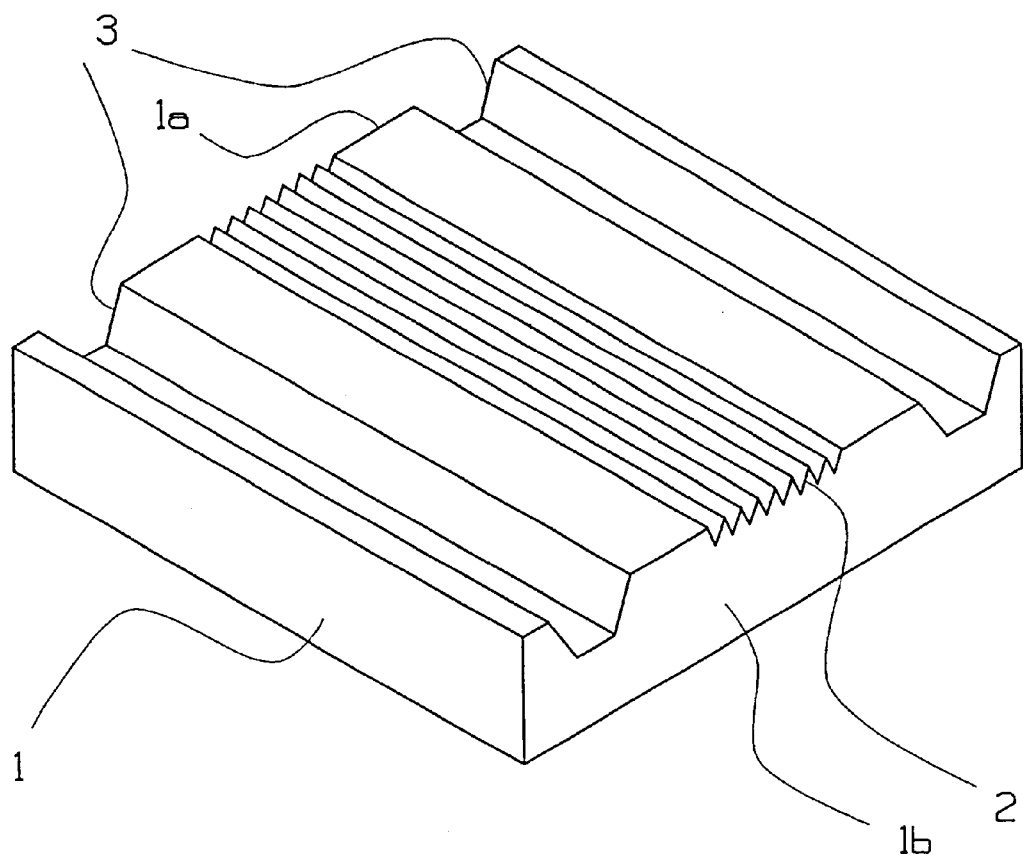
FIGS. 1 and 2 illustrate a high-precision part according to a preferred embodiment of the invention.
Figure 2:
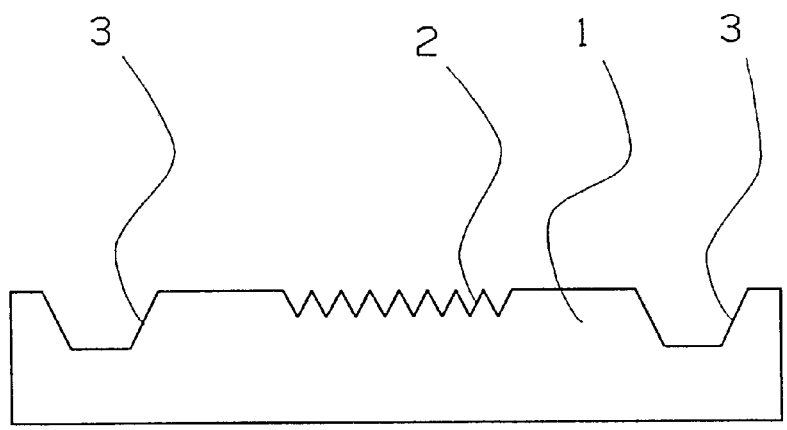

FIGS. 1 and 2 show in perspective and from one side a high-precision part or fixture 1, preferably made of silicon. The fixture 1 has grooves 2 for optical fibres from e.g. a fibre ribbon cable. The number of grooves 2 in FIGS. 1 and 2 are eight but can be any arbitrary number. The fixture 1 has also grooves 3 for guide pins (which are used for the external mechanical connection. The grooves 2, 3 can have any arbitrary shape in cross-section but have preferably a V-shape. The grooves 3 advantageously have flat bottoms. In the following they will be referred to as V-grooves. All the V-grooves are straight and parallel and run on the upper side of the fixture from a first fixture side 1a to a second fixture side 1b.

Preferably several fixtures 1 are manufactured together on a silicon disc. All the V-grooves 2, 3 are defined by one and the same mask, after which wet etching takes place. The precision between the V-grooves 2, 3 is thereby ensured.

Figure 3:
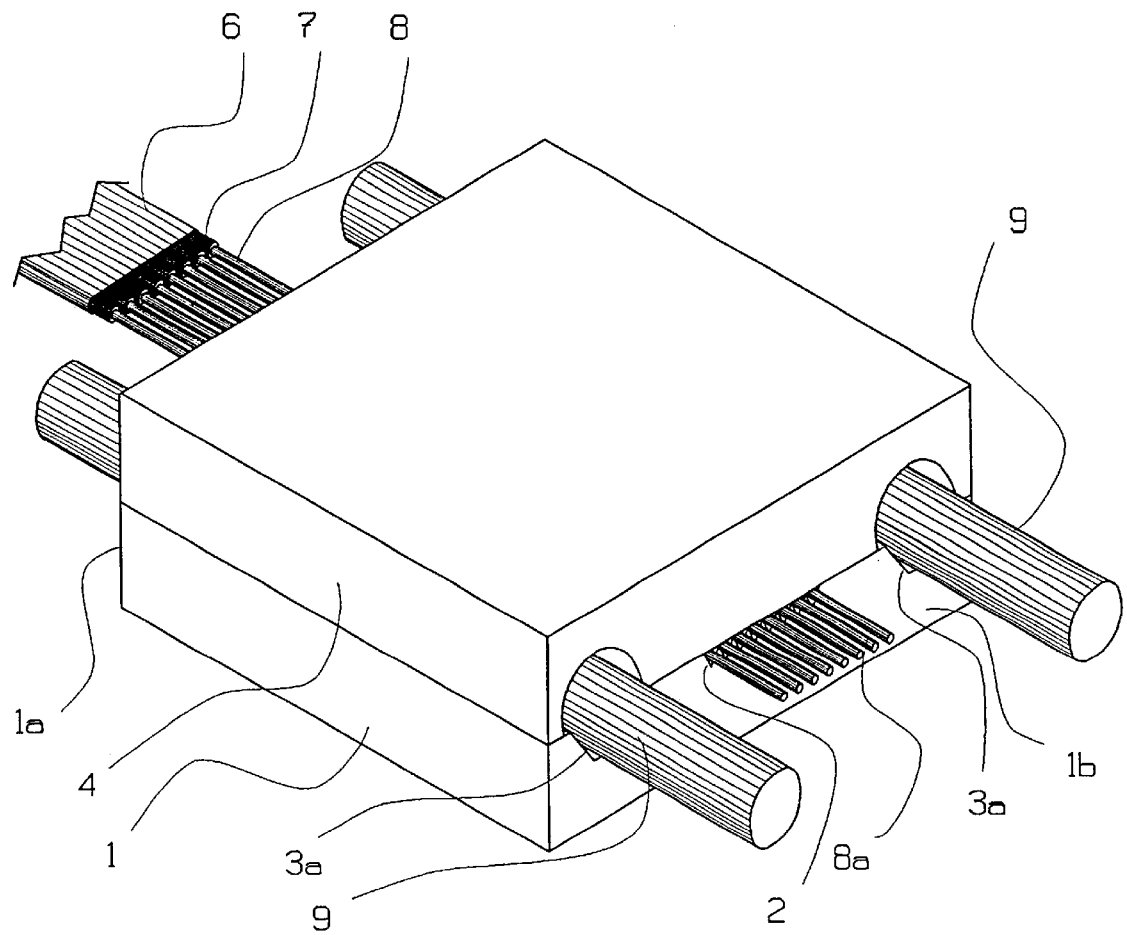
FIGS. 3 and 4 illustrate a high-precision part with a lid and fibres resp. guide pins positioned according to a preferred embodiment of the invention.
Figure 4:
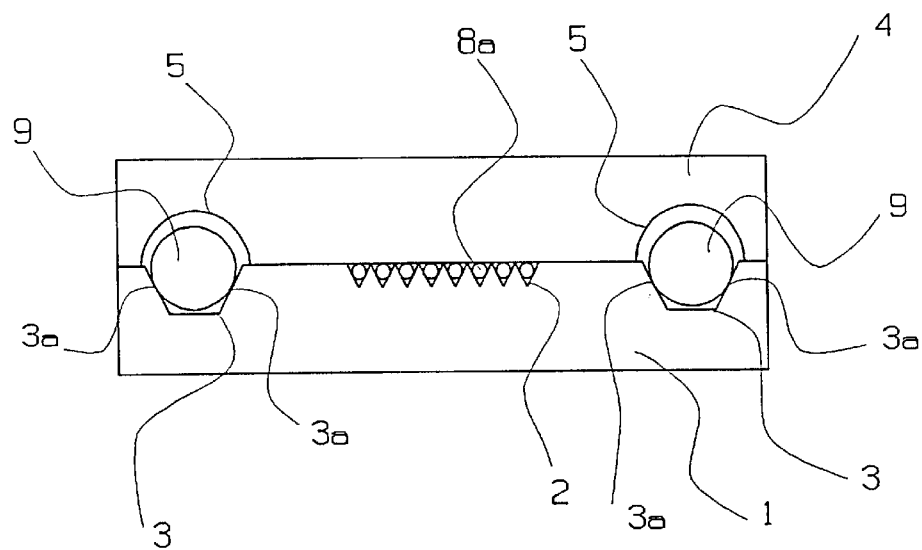

Above the fixture 1 is, according to the invention, fastened an upper part or a lid 4 made of glass, silicon or some other material. FIGS. 3 and 4 show in perspective and from one side the fixture 1 and lid 4. The V-grooves 2 for the fibres form together with the lid 4 triangular capillaries with an accurate fit to the outer dimensions of the fibres. The lid can have a recess 5 above the V-grooves 3 for the guide pins which permits a loose fit to the outer dimensions of the guide pins. The lid 4 can be joined to the fixture 1 with bonding technique, e.g. anodic bonding. The choice of material 1 for the lid 4 determines which bonding method will be used. The bonding is preferably carried out simultaneously for all the fixtures on the silicon disc, after which the separate details are sawn out.

Optical fibres 8 are, according to the invention, introduced into the triangular capillaries (i.e. in the grooves 2 intended for the fibres) from the first fixture side 1a so that the fibre ends 8a stick out through the second fixture side 1b. The fibres 8 can originate e.g. from a fibre ribbon cable 6 which is peeled in one end from its protective casing and from the protective casings 7 of the individual fibres. The lid 4 and/or fixture 1 can be bevelled on the side where the fibres 8 are introduced so that the triangular capillaries receive funnel-like openings (not shown in the Figures). This considerably facilitates the introduction of the fibres 8.

The fibres 8 can be fixed by any suitable means, e.g. by gluing in the V-grooves 2, but this is not necessary. They can also be fixed in a mould cavity during, for example, forming of a capsule 11. The guide pins 9 are introduced into the grooves 3 intended for the guide pins.

Figure 5:
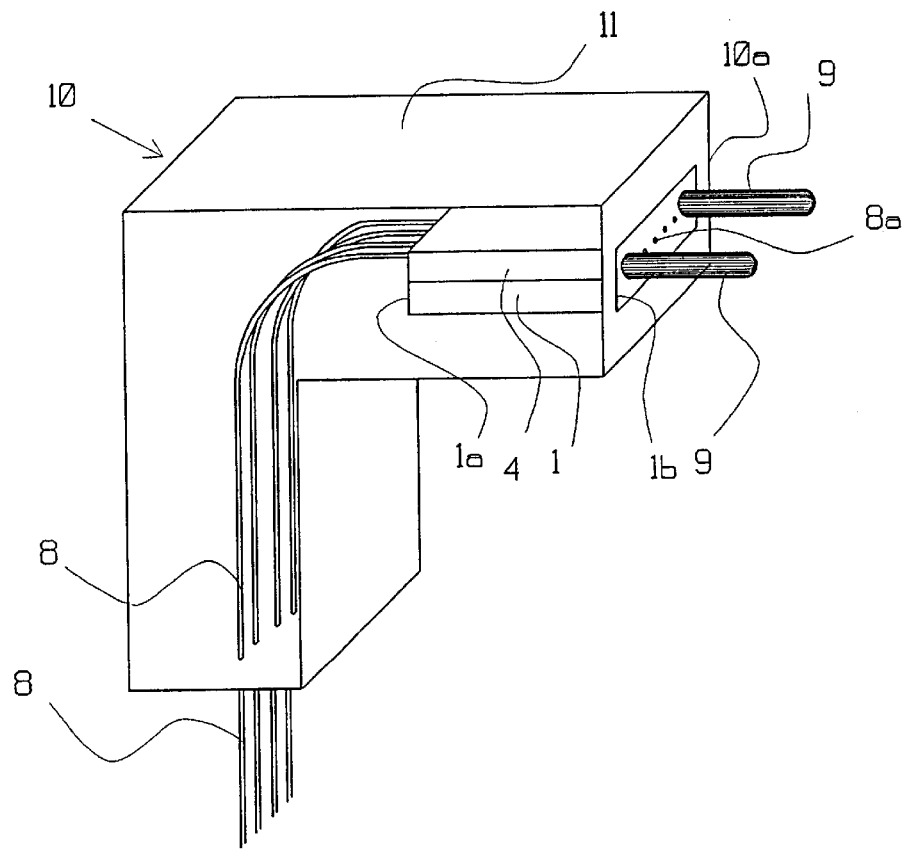
FIGS. 5–7 illustrate an angled opto-mechanical connector according to a preferred embodiment of the invention.

This structure (fixture 1, lid 4, fibres 8 and guide pins 9) is completely or partially surrounded by a capsule 1 1, preferably made of plastic, see FIG. 5. The fibre ribbon 8 sticks out through the plastic capsule 11 on the rear side. The fixture 1 is so positioned that the fibre ribbon 8 is bent in a predetermined angle in the plastic capsule 11. Preferably, the fibres 8 are bent through a 90° angle (with a predetermined bending radius).

The plastic capsule 11 is advantageously produced by injection moulding or extrusion (transfer moulding). If the capsule is made of another material, other forming methods can be used. The positioning in the mould cavity can be performed in the same way as given in Swedish Patent Application No. 9403573-0, i.e. by influencing fixture 1 from below with an upwardly directed force (e.g. a spring force) so that the mould cavity guide pins 9 by means of suitably shaped opposing surfaces (from above) are brought to rest against the side walls 3a of the V-grooves and consequently fix the fixture and fibres. The grooves 2, 3 should be so constructed that the centerlines of the fibres 8, fixed in the triangular capillaries, lie in the same plane as the center-lines of the guide pins 9.

The optical and mechanical interface obtained should preferably be an MTconnector interface. Directly injecting onto the fibre ribbon 8 and the fixture scan be used and in this case the fibre ribbon 8 consequently does not need to be glued, which simplifies and reduces the cost of manufacturing.

Figure 6:
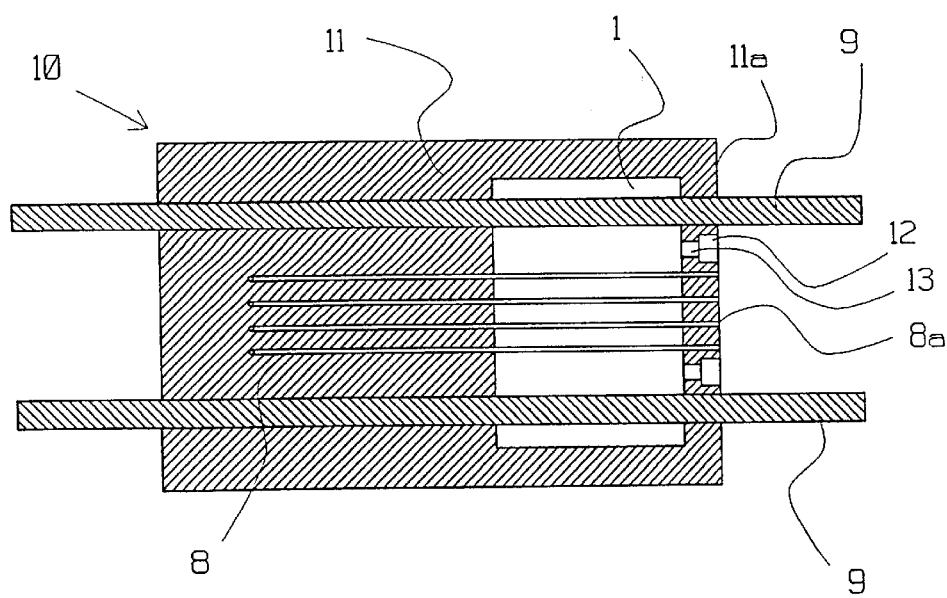
Figure 7:
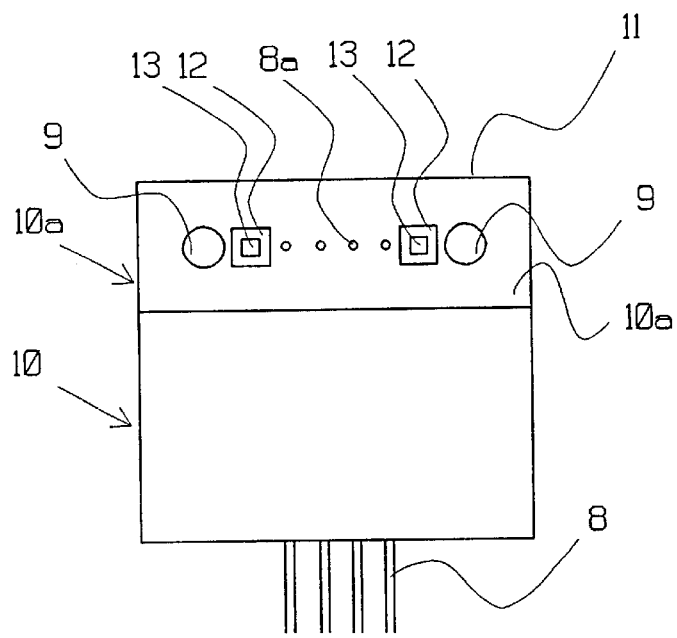

FIG. 5 shows schematically the finished connector 10 in perspective. One side of the connector has been made transparent for the sake of illustration. FIG. 6 shows a cross-section of the connector and in FIG. 7 the connector is shown seen from in front. The complete connector advantageously has guide pins 9, which are not identical with the guide pins used in the mould cavity. The guide pins can be of different lengths (cf. FIG. 3, FIG. 5 and FIG. 6).

Figure 8:
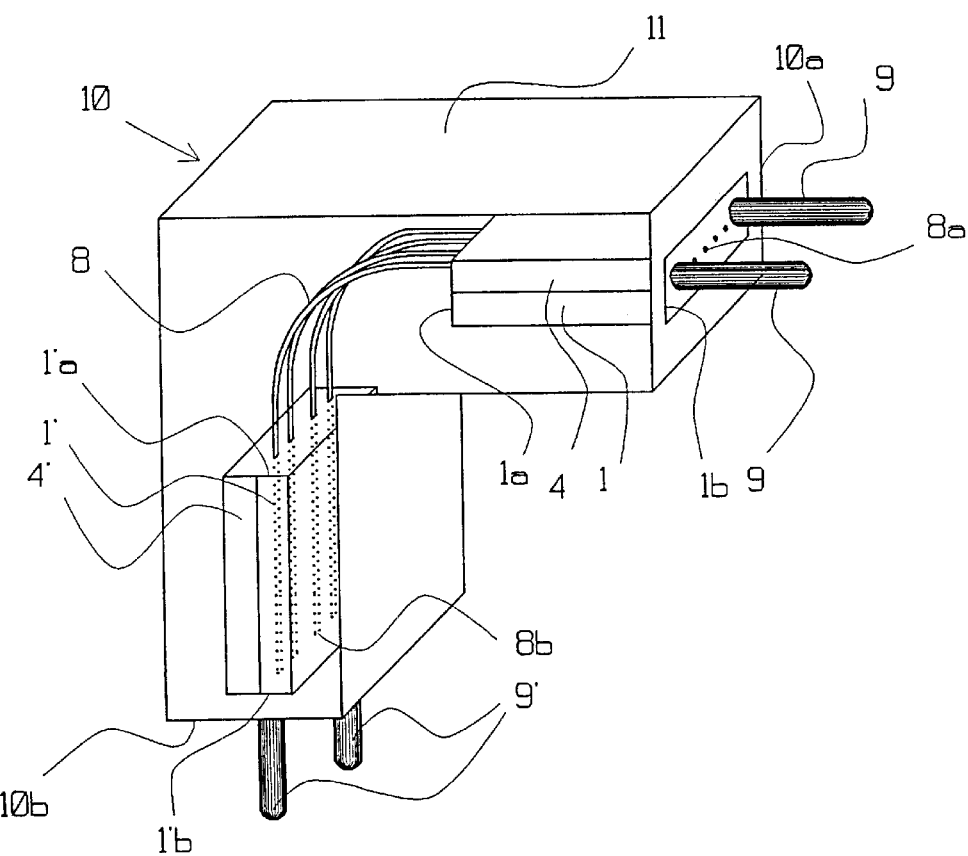
FIG. 8 illustrates an angled opto-mechanical connector according to another preferred embodiment.

In a further embodiment the connector 10 has opto-mechanical interfaces at both ends as is shown in FIG. 8. One side of the connector has also been made transparent here for the sake of illustration. A second precision part 1' with lid 4' and guide pins 9' are consequently mounted at the second end 8b of the fibre ribbon, which has consequently also been peeled. The second precision part 1' with lid 4' and guide pins 9' advantageously has the same appearance as described in connection to the previous embodiment. The fibre ribbon 8 shall have a length adapted in order to be completely cast into the plastic capsule 11. The structure obtained (the fibre ribbon 8 with fixtures 1, 1', lids 4, 4', and guide pins 9, 9' mounted in each end 8a, 8b of the fibre ribbon 8) is completely or partially surrounded by a plastic capsule 11. The two fixtures 1,1' are so positioned that the fibre ribbon 8 is bent through a predetermined angle, e.g. 90°, in the plastic capsule 11.

The right-angled optical connector 10 can, according to the invention, be used for example to provide a space-saving optical connection between a circuit board and a wiring side.

In yet another embodiment the connector has an angle of 180° between the entering and exiting fibre ribbons (not shown). This connection, which can have the shape of a U-bend, can naturally be produced with the above described methods. It can be used to loop optical signals between two adjacent boards.

The fibre ends 8a, 8b are polished in order to minimize the damping when the connector is connected. The polishing of the fibre ends 8a, 8b can cause problems because many different materials appear in the front 10a, 10b of the connector. By having an opposing surface for fixture 1 in the mould cavity and using the rigidity of the fibres 8, a precision part 1,1' can be moulded where only the fibre ends 8a, 8b stick out from the front 10a,10b of the connector, as shown e.g. in FIG. 6. In this case polishing takes place, according to the invention, only of the plastic capsule front 11a and the fibre ends 8a, 8b, as for an ordinary MT-connector.

Alternatively, the mould cavity can be shaped in such a way that a tongue of plastic (not shown) is formed, which covers the fibre ends 8a, 8b sticking out of the plastic capsule front 11a. In particular, this tongue has a waist (not shown) near the front 11a of the plastic capsule so that the tongue can easily be broken off (at the waist) after the casting of the plastic capsule. Polishing of the fracture surface of the front can then take place.

If the opposing surfaces in the mould cavity are manufactured in a suitable way (e.g. bevelled), the impressions 12,13 from the opposing surfaces can also be used as markers in order to determine how much plastic should remain between the front 11*a* of the plastic capsule and the enclosed fixture 1,1' so that the polishing can be stopped at a predetermined distance.

By using micromechanical supporting elements as in the present invention, the precision requirements for the mould cavity are reduced considerably. The risk of contamination of the grooves 2, 3 is reduced considerably in relation to the case if the grooves would lie in the tool. This gives a more rational manufacture. The castin fixture 1,1' functions as an anchor in the plastic and facilitates the fixing of the fibres.

If the fibres 8 are injected directly onto the micromechanical supporting element 1, the conventional gluing stage disappears, which gives a simpler and cheaper manufacturing. The polishing becomes simpler if the second side 11*b*,1*b* of the fixture is covered by plastic, and consequently only a combination of fibre and plastic need to be polished. By using opposing surfaces which give impressions 12,13 with markers, the distance to the other side of the fixture can be matched during polishing.

What is claimed is:

1. Angled opto-mechanical connector comprising:
   a fixture with a first set of straight and parallel grooves and a second set of grooves running on an upper side of the fixture from a first fixture side to a second fixture side, the first set of grooves being smaller than the second set of grooves and lying substantially in one plane;
   a lid fastened above the fixture;
   optical fibres having fibre ends that are placed in capillaries which are formed between the smaller grooves of the fixture and the lid in such a way that they stick out through at least one of the sides of the fixture; and
   a capsule which at least partially surrounds the fixture, the lid and the fibres, the fibres sticking out of the fixture and bending in a direction away from said plane.

2. Angled opto-mechanical connector comprising:
   a first fixture and a second fixture each having straight and parallel grooves of two sizes running on an upper side of the fixture from a first fixture side to a second fixture side;
   a first lid fastened above the first fixture and a second lid fastened above the second fixture;
   a plurality of optical fibres each having a first end portion and a second end portion, the first end portions being mounted in capillaries which are formed between the smaller grooves of the first fixture and the first lid and so placed that they stick out through at least one side of the first fixture, the second end portions being mounted in the capillaries which are formed between the smaller grooves of the second fixture and the second lid, the first and second fixtures being located so that portions of each of the optical fibres between the first end portions and the second end portions are bent away from a plane having the smaller grooves of the first fixture; and
   a capsule which at least partially surrounds the fixtures, the lids and the fibres.

3. Angled opto-mechanical connector according to claim 2, wherein the fibres are bent approximately 90 degrees relative to said plane.

4. Angled opto-mechanical connector (10) according to claim 2, wherein the fibres are bent approximately 180 degrees relative to said plane.

5. Angled opto-mechanical connector according to claim 1 or 2, further comprising guide pins located in the larger grooves.

6. Angled opto-mechanical connector according to claim 1 or 2, wherein the most distal ends of said fibres are level with an edge of the connector.

7. Angled opto-mechanical connector according to claim 1 or 2, wherein the most distal ends of the fibres are polished.

8. Angled opto-mechanical connector according to claim 1 or 2, wherein the capsule is made of plastic.

9. Method of producing an angled opto-mechanical connector, comprising
   manufacturing a fixture with straight and parallel grooves running on an upper side of the fixture from a first fixture side to a second fixture side, at least some of the grooves for receiving optical fibres and others of the grooves for receiving guide pins;
   fastening a lid above the fixture;
   introducing fiber ends in the grooves intended for the fibres;
   introducing guide pins in the grooves intended for the guide pins,
   positioning the fixture, lid, fibre ends and guide pins in a mould cavity in such a way that the fibres are bent away from a plane having said grooves for receiving said optical fibres; and
   at least partially surrounding the fixture, lid, fibre ends, and guide pins with a capsule.

10. Method according to claim 9, further comprising the steps of:
    manufacturing a second fixture with straight and parallel grooves running on the upper side of the second fixture from a first fixture side to a second fixture side, the grooves for receiving optical fibres and guide pins;
    fastening a second lid above the second fixture,
    introducing the other ends of the fibres in the grooves on the second fixture intended for the fibres;
    introducing guide pins into the grooves on the second fixture intended for the guide pins; and
    positioning the second fixture, the second lid, the other ends of the fibres, and the guide pins in the mould cavity and then at least partially surrounding the second fixture, the second lid, the other ends, and the guide pins by the capsule.

11. Method according to claim 9, wherein the surrounding of the fixture, lid, fibre ends, and guide pins includes injection moulding or transfer moulding the capsule.

12. Method according to claim 9, wherein the fibres are positioned in the mould cavity in such a way that they are bent relative to said plane by approximately 90 degrees.

13. Method according to claim 12, wherein the fibres are positioned in the mould cavity in such a way that they are bent approximately another 90 degrees so as to define a 180 degree turn.

14. Method according to claim 9, wherein the most distal ends of the fibre are polished.

15. Method according to claim 9, wherein the lid is bevelled above the grooves for the guide pins in such a way that a loose fit to the outer dimensions of the guide pins is obtained.

16. Method according to claim 9, wherein the lid is fastened above the fixture by bonding.

17. Method according to claim 9, wherein the mould cavity includes opposing surfaces for the positioning of the fixture, the lid, the fibre ends, and the guide pins so that when forming the connector, at least the second fixture side is covered by plastic.

18. Method according to claim 17, wherein the opposing surfaces are formed in such a way that impressions from the opposing surfaces can be used as markers in order to determine how large a distance is between an end surface of the connector and the second fixture side.

19. Method according to claim 17 or 18, wherein a portion of the fibre ends stick out from the second fixture side, the portion of fibre ends that stick out of the second fixture being enclosed by a plastic tongue with a waist, further comprising breaking off the plastic tongue at the waist.

20. Method according to claim 9, wherein the mould cavity provides an upwardly directed force to the fixture so that the guide pins are in contact with side walls of the grooves.

21. An angled opto-mechanical connector, comprising:
 a plurality of optical fibers, each of said optical fibers having a first end portion and a second end portion;
 a fixture having a plurality of grooves that each receive at least a portion of said first end portion of one of said optical fibers, at least some of said grooves being substantially located in a first plane;
 a lid covering at least a portion of said fixture, said portions of said optical fibers that are received by said grooves being located between said fixture and said lid,
 each of said optical fibers having an intermediate portion that is located between said first portion and said second portion, said intermediate portions of said optical fibers being bent away from said plane; and
 a capsule that at least partially surrounds said intermediate portions of said optical fibers, said lid, and said fixture.

22. The angled opto-mechanical connector of claim 21, wherein said intermediate portions are bent approximately 90 degrees relative to said plane.

23. The angled opto-mechanical connector of claim 21, wherein said grooves are straight and parallel.

24. The angled opto-mechanical connector of claim 21, further comprising a guide pin groove for receiving a guide pin.

25. The angled opto-mechanical connector of claim 24, wherein said guide pin groove has a non-circular cross-section.

26. The angled opto-mechanical connector of claim 21, wherein said second end portions of each of said optical fibers are parallel to each other and lie in a second plane, said second plane being skewed relative to said first plane.

27. The angled opto-mechanical connector of claim 21, further comprising a second fixture having a plurality of grooves and a second lid, said second end portions being located in said grooves of said second fixture and being located between said second fixture and said second lid.

28. The angled opto-mechanical connector of claim 27, wherein at least some of said grooves of said second fixture are substantially located in a second plane that intersects said first plane.

29. The angled opto-mechanical connector of claim 27, wherein said capsule is a molded item that completely surrounds said intermediate portions of said optional fibers.

30. The angled opto-mechanical connector of claim 21, wherein said capsule is L-shaped and the most distal ends of said optical fibers are exposed at opposite ends of said L-shaped capsule.

31. The angled opto-mechanical connector of claim 30, further comprising a plurality of guide pins, at least one of said guide pins protruding from each of said opposite ends of said L-shaped capsule.

* * * * *